(12) United States Patent
Rayer et al.

(10) Patent No.: US 10,914,838 B2
(45) Date of Patent: Feb. 9, 2021

(54) TOF CAMERA, MOTOR VEHICLE, METHOD FOR PRODUCING A TOF CAMERA AND METHOD FOR DETERMINING A DISTANCE TO AN OBJECT

(71) Applicant: OSRAM GmbH, Munich (DE)

(72) Inventors: Mathieu Rayer, Augsburg (DE); Ralph Wirth, Lappersdorf (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 376 days.

(21) Appl. No.: 15/916,327

(22) Filed: Mar. 9, 2018

(65) Prior Publication Data
US 2018/0259646 A1    Sep. 13, 2018

(30) Foreign Application Priority Data

Mar. 13, 2017   (DE) .......................... 10 2017 204 073

(51) Int. Cl.
*G01S 17/10*     (2020.01)
*G01S 7/481*     (2006.01)
(Continued)

(52) U.S. Cl.
CPC ............. *G01S 17/10* (2013.01); *G01S 7/486* (2013.01); *G01S 7/4816* (2013.01); *G01S 17/89* (2013.01); *G01S 17/931* (2020.01)

(58) Field of Classification Search
CPC ...................................................... G01C 3/08
See application file for complete search history.

(56) References Cited

U.S. PATENT DOCUMENTS

2016/0295193 A1 * 10/2016 Van Nieuwenhove ...................... G01S 17/894

FOREIGN PATENT DOCUMENTS

DE        2813089 A1    10/1979
DE    202014101550 U1     7/2015
(Continued)

OTHER PUBLICATIONS

German Search Report based on application No. 10 2017 204 073.4 (12 pages) dated Nov. 29, 2017 (for reference purpose only).

*Primary Examiner* — Luke D Ratcliffe

(57) ABSTRACT

A TOF camera for determining a distance to an object comprising: a radiation source configured to emit electromagnetic radiation toward the object, radiation-sensitive sensor elements configured and arranged to detect the electromagnetic radiation reflected/scattered by the object, an optical element arranged to influence the emitted electromagnetic radiation in the radiation path of the reflected/scattered electromagnetic radiation between the object and the sensor elements, a computing unit electrically connected to the radiation source and sensor elements configured to determine a time duration required by the electromagnetic radiation from the radiation source to the object; from the object to the sensor elements; and to determine the distance between the TOF camera and the object depending on the time duration determined. The sensor elements and/or the optical element are configured such that different sensor elements detect the reflected/scattered electromagnetic radiation from different solid angles on the far side of the optical element.

20 Claims, 5 Drawing Sheets

(51) Int. Cl.
*G01S 17/931* (2020.01)
*G01S 7/486* (2020.01)
*G01S 17/89* (2020.01)

(56) References Cited

FOREIGN PATENT DOCUMENTS

EP 2910970 A1 8/2015
GB 2017449 A 10/1979

* cited by examiner

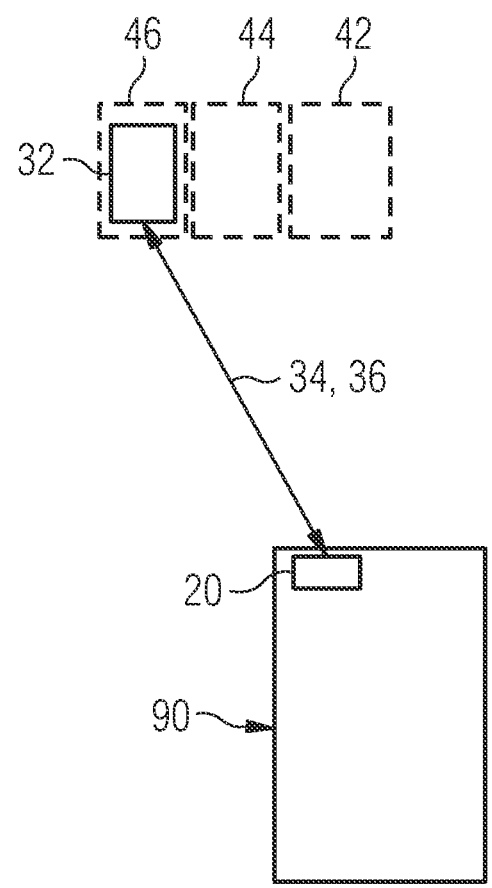

TOF CAMERA, MOTOR VEHICLE, METHOD FOR PRODUCING A TOF CAMERA AND METHOD FOR DETERMINING A DISTANCE TO AN OBJECT

CROSS-REFERENCE TO RELATED APPLICATION

This application claims priority to German Patent Application Serial No. DE 10 2017 204 073.4, which was filed Mar. 13, 2017, and is incorporated herein by reference in its entirety.

TECHNICAL FIELD

The invention relates to a TOF camera, a motor vehicle, a method for producing a TOF camera, and a method for determining a distance to an object.

SUMMARY

A conventional TOF (Time Of Flight) camera, which is also referred to as a PMD (Photonic Mixing Device) camera, comprises a TOF sensor, which generally is also referred to as a PMD sensor and hereinafter simply as "sensor arrangement". Such a sensor arrangement comprises a plurality of sensor elements, which are often arranged in matrix form, that is to say in rows and columns, and which are each light-sensitive. A TOF camera is a 3D camera system that measures distances from the TOF camera to an object by the time of flight (TOF, also ToF) method. To that end, a region, also called scene, in the field of view of the camera is irradiated by means of a radiation pulse and the TOF camera measures, for each pixel, that is to say for each sensor element, the time needed by the corresponding electromagnetic radiation to reach the object and return again. The required time is directly proportional to the distance. The TOF camera thus yields for each pixel the distance of the object imaged thereon. The principle corresponds to laser scanning with the advantage that an entire region is recorded all at once and need not be scanned. A TOF camera is used nowadays for example in a motor vehicle for measuring a distance between the motor vehicle and some other traffic object or in a robot for recognizing an obstacle.

The electromagnetic radiation used can be for example light in the visible range, infrared radiation or UV radiation. The sensor arrangement can comprise a filter, or a filter can be optically disposed upstream of the sensor arrangement, which filter transmits only electromagnetic radiation in the wavelength range of the emitted electromagnetic radiation. A good signal-to-noise ratio can be achieved as a result.

The electromagnetic radiation emitted by a radiation source of the conventional TOF camera has a symmetrical radiation distribution, in particular a Gaussian or a Lambertian radiation distribution. In the case of these radiation distributions, a radiation intensity is the highest along the axis of symmetry of the radiation and falls with increasing distance from the axis of symmetry. In general, the axis of symmetry of the radiation is perpendicular to an optically active surface of the radiation source by which the electromagnetic radiation is emitted. In a manner corresponding thereto, in the case of the conventional TOF camera, the sensor elements each detect electromagnetic radiation from a specific solid angle, wherein the solid angles have identical magnitudes.

In order to obtain a good signal-to-noise ratio, it is advantageous to align the TOF camera such that the object to which the distance is to be measured lies on the axis of symmetry of the radiation and thus in the region of the highest radiation intensity. Alternatively or additionally, the TOF camera can be aligned such that the object is arranged centrally in the detected solid angles. In other words, the TOF camera, if a good signal-to-noise ratio is to be achieved, has to be aligned such that the object is arranged frontally in front of the TOF camera and/or centrally in a field of view of the TOF camera. The further away the object is from the axis of symmetry, the worse the signal-to-noise ratio becomes. Therefore, the TOF camera has to be aligned depending on the region in which the object is situated relative to the TOF camera. Aligning the TOF camera can be carried out laboriously by hand or by means of a complex actuator arrangement. Furthermore, aligning the TOF camera is not always possible, in which case a poor signal-to-noise ratio must then be accepted. A poor signal-to-noise ratio can lead to an inaccurate determination of the distance from the TOF camera to the object.

One problem addressed is that of providing a TOF camera which enables in a simple manner a particularly precise determination of a distance to an object whose relative position in relation to the TOF camera is known.

One problem addressed is that of providing a motor vehicle in which a precise determination of a distance to an object whose relative position in relation to the motor vehicle is known is possible in a simple manner.

One problem addressed is that of providing a method for producing a TOF camera which can be carried out simply, rapidly and/or cost-effectively and/or which contributes to a precise determination of a distance to an object whose relative position in relation to the TOF camera is known being possible by means of the TOF camera in a simple manner.

One problem addressed is that of providing a method for operating a TOF camera which can be carried out simply, rapidly and/or cost-effectively and/or which contributes to a precise determination of a distance to an object whose relative position in relation to the TOF camera is known being possible by means of the TOF camera in a simple manner.

One problem addressed is solved by means of a TOF camera for determining a distance to an object, comprising a radiation source, which is configured to emit electromagnetic radiation in a direction toward the object, a plurality of radiation-sensitive sensor elements, which are configured and arranged such that they detect the electromagnetic radiation reflected and/or scattered by the object, an optical element, which is arranged for the purpose of influencing the reflected and/or scattered electromagnetic radiation in the radiation path of the reflected and/or scattered electromagnetic radiation between the object and the sensor elements, and a computing unit, which is electrically connected to the radiation source and the sensor elements and which is configured to determine a time duration required by the electromagnetic radiation from the radiation source to the object and from the object to the sensor elements and to determine the distance between the TOF camera and the object depending on the time duration determined, wherein the sensor elements and/or the optical element are/is configured such that different sensor elements from among the latter detect the reflected and/or scattered electromagnetic radiation from correspondingly different solid angles on the far side of the optical element and that at least some of the far-side solid angles have different magnitudes.

If consideration is given to one of the sensor elements and the corresponding solid angle observed by means of said sensor element, then the signal-to-noise ratio is all the better, the smaller the corresponding solid angle. The better the signal-to-noise ratio, the more precisely it is possible to determine the distance to an article, for example the object or a part of the object, which is arranged within the solid angle. This applies to each of the sensor elements and the corresponding solid angles. If a relative position of the object with respect to the TOF camera is known or can be anticipated, then the far-side solid angles can be set such that the object is arranged at particularly small solid angles from among the far-side solid angles during the distance measurement. Detecting the reflected and/or scattered electromagnetic radiation from the far-side solid angles having different magnitudes therefore makes it possible, in a simple manner, that the distance to the object can be determined particularly precisely, in particular on account of a very good signal-to-noise ratio. This holds true even if the object is not arranged frontally in front of the TOF camera, is not arranged centrally in a field of view of the TOF camera and/or is not arranged along a straight line that is perpendicular to an optically active surface of a sensor arrangement which comprises the sensor elements.

The far-side solid angles are solid angles which extend from a side of the optical element facing away from the sensor elements into a half-space situated on the side of the optical element facing away from the sensor elements. In other words, the far-side solid angles are solid angles which lie on the far side of the optical element as viewed from the sensor elements. In contrast thereto, near-side solid angles are solid angles which extend from the sensor elements to the optical element and which are situated between the optical element and the sensor elements. In other words, the near-side solid angles are solid angles which are situated on the near side of the optical element as viewed from the sensor elements.

The sensor elements can form a TOF sensor and/or a PMD sensor. The radiation source can comprise one, two or more electromagnetic radiation-emitting components, for example LEDs and/or OLEDs. The electromagnetic radiation can comprise or be light in the visible range, IR radiation and/or UV radiation.

Optionally an optical filter can be arranged between the object and the sensor elements, which filter transmits to the sensor elements only electromagnetic radiation having wavelengths corresponding to the wavelengths of the electromagnetic radiation emitted by the radiation source. This can contribute to the fact that the signal-to-noise ratio is particularly good and the fact that the distance can be determined particularly precisely.

In accordance with one development, the optical element and/or the sensor elements are configured such that the magnitudes of the far-side solid angles are adapted to a region in which the object is expected proceeding from the TOF camera. In particular, the solid angle or solid angles in which the region lies is or are particularly small compared with the solid angles in which the region does not lie. If it is known, for example, for what purpose the TOF camera is intended to be used, in particular in what situations distances to what objects are intended to be identified, and where the region is arranged relative to the TOF camera, then the magnitudes of the far-side solid angles can be adapted such that the solid angle or solid angles in which said region lies is or are particularly small. If the object then appears in the region during intended use of the TOF camera, the signal-to-noise ratio is particularly good during the determination of the distance to the object, for which reason the distance to the object can then be determined particularly precisely. To put it clearly, the magnitudes of the solid angles are coordinated exactly with the use and arrangement of the TOF camera during the operation of the TOF camera, as a result of which the distance to an object in a region in which the object is typically expected in the case of said use and said arrangement of the TOF camera can be determined particularly precisely.

In accordance with one development, the optical element and/or the sensor elements are/is configured such that one or a plurality of the far-side solid angles within which the region lies is or are smaller than the far-side solid angles within which the region does not lie. In other words, the magnitudes of the solid angles are adapted in such a way that the region lies in a partial segment of the field of view of the TOF camera in which the solid angles assigned to the individual sensor elements are particularly small relative to other partial segments of the field of view of the TOF camera. This contributes to the fact that the signal-to-noise ratio is particularly good during the determination of the distance to the object in the region, and thus the fact that the distance to the object in the region can be determined particularly precisely.

In accordance with one development, the optical element and/or the sensor elements are configured such that, in the case of a dynamic variation of the region, the magnitudes of the far-side solid angles are adapted depending on the dynamic variation of the region. By way of example, a position of the region relative to the TOF camera can be dynamically varied if the region moves relative to the TOF camera, for example if the region and/or the TOF camera move(s). In other words, the object may be expected in one region at a first point in time and the object may be expected in another region after a certain time duration has elapsed, for example because the object and/or the TOF camera move(s). In this context, a movement of the region relative to the TOF camera is tantamount to the object being expected in one region at one point in time and being expected in another region at another point in time. If the region moves relative to the TOF camera or the object is expected in one region at one point in time and is expected in the other region at another point in time, then the magnitudes of the solid angles can be dynamically adapted to this movement and/or for change, specifically such that a particularly good signal-to-noise ratio can still be achieved. This can be achieved, for example, by the magnitudes of the solid angles being adapted such that the partial segment of the field of view of the TOF camera which lies within the smallest solid angles observed by the corresponding sensor elements follows the moving region or is aligned with the region at the new position.

In accordance with one development, the sensor elements are configured such that different sensor elements from among the latter detect the electromagnetic radiation that has passed through the optical element from correspondingly different solid angles on the near side of the optical element and that at least some of the near-side solid angles have different magnitudes. By way of example, the near-side solid angles, that is to say the solid angles which lie between the sensor elements and the optical element and which are respectively assigned to one of the sensor elements, may already have different magnitudes. That is to say that, by means of different sensor elements from among the latter, areas of the optical element having correspondingly different sizes are observed. These different magnitudes of the near-side solid angles are then transferred to the different magnitudes of the corresponding far-side solid angles by means of the optical element. In this case, the optical element may or may not influence the difference in the magnitudes of the solid angles. In other words, the optical element may be a partial source of the differences in the magnitudes of the solid angles or merely transfer the differences in the magnitudes of the near-side solid angles. In still other words, the different magnitudes of the far-side solid angles may result exclusively from the different magnitudes of the near-side solid angles. As an alternative thereto, the different magnitudes of the far-side solid angles may result from the different magnitudes of the near-side solid angles and the influence of the optical element. The sensor arrangement may comprise, for the purpose of providing the different magnitudes of the near-side solid angles, different sensor elements, for example, by means of which solid angles having different magnitudes can be observed.

As an alternative thereto, the different magnitudes of the far-side solid angles may result exclusively from the properties of the optical element. That is to say that the near-side solid angles may all have the same magnitude, for which purpose, for example, exclusively structurally identical sensor elements can be used. The optical element then ensures that electromagnetic radiation is directed from different solid angles having different magnitudes onto corresponding sensor elements from among the latter.

In accordance with one development, the sensor elements may be configured such that the magnitudes of the near-side solid angles are adapted depending on the dynamic variation of the region. Adapting the magnitudes of the near-side solid angles depending on the dynamic variation of the region can contribute to dynamically adapting the magnitudes of the far-side solid angles to the dynamic variation of the region, since, on account of the optical element, a variation of the magnitudes of the near-side solid angles varies the magnitudes of the far-side solid angles. In other words, it is possible to react to the dynamic variation of the region with a dynamic variation of the magnitudes of the near-side solid angles, as a result of which the magnitudes of the far-side solid angles can be adapted to the dynamic variation of the region. The magnitudes of the near-side solid angles can be adapted for example by virtue of the sensor elements being configured such that the sizes of their fields of view are adaptable, for example by means of adjustable diaphragms.

In accordance with one development, the sensor elements form a camera. In other words, the sensor arrangement is a camera.

In accordance with one development, the optical element may comprise at least one asymmetrical optical surface arranged such that the reflected and/or scattered electromagnetic radiation passes through the asymmetrical optical surface. As an alternative or in addition to the sensor elements, therefore, the optical element, in particular the asymmetrical optical surface, is configured such that it contributes to the different magnitudes of the solid angles. By way of example, the near-side solid angles can have identical magnitudes and, on account of the optical element and the asymmetrical optical surface thereof, far-side solid angles having different magnitudes can be observed by means of the sensor elements which all observe areas of the optical element having the same size and all have a field of view having the same size. This may contribute to the fact that detecting the electromagnetic radiation from the solid angles having different magnitudes is possible in a particularly simple and/or cost-effective manner. As an alternative thereto, the sensor elements can contribute by means of observing near-side solid angles having different magnitudes or areas of the optical element having different sizes and the optical element can also contribute by means of additionally varying the magnitude ratios of the different solid angles with respect to one another.

The asymmetrical optical surface may be an entrance surface of the optical element, for example, through which the reflected and/or scattered electromagnetic radiation proceeding from the object enters the optical element. As an alternative thereto, the asymmetrical optical surface may be an exit surface of the optical element, for example, through which the electromagnetic radiation leaves the optical element in a direction toward the sensor elements. As an alternative thereto, the asymmetrical optical surface may be a surface within the optical element, for example. Furthermore, the optical element may have two or more of the optical surfaces mentioned above, which are arranged one behind another in the beam path of the electromagnetic radiation and which cooperate in order to generate the first asymmetrical radiation distribution.

If the optical surface forms the entrance surface or the exit surface of the optical element, then this can be produced for example by shaping of the optical element and/or by means of surface treatment of the optical element, for example by means of grinding or by means of a laser. If the optical surface lies in the optical element and is at a distance from the entrance surface and the exit surface, then the optical surface can be produced for example by means of internal engraving, for example by means of a laser.

In accordance with one development, the optical element is configured such that the asymmetrical optical surface is adapted depending on the dynamic variation of the region. Adapting the optical surface depending on the dynamic variation of the region can contribute to dynamically adapting the magnitudes of the solid angles to the dynamic variation of the region. In other words, it is possible to react to the dynamic variation of the region with a dynamic variation of the optical surface, as a result of which the magnitudes of the solid angles can be adapted to the dynamic variation of the region. The optical surface can be dynamically adapted for example by virtue of the optical element being configured such that the beam paths of the emitted electromagnetic radiation are variable and in particular adaptable, as a result of which the local radiation intensity is adaptable. By way of example, the optical element can comprise one, two or more electrically drivable fluid lenses, the entrance surfaces and/or exit surfaces of which can be varied with the aid of electrical voltages.

In accordance with one development, the asymmetrical optical surface is configured as radiation-diffracting, radiation-refracting and/or segmented. This can contribute, in a particularly simple manner, to observing solid angles having different magnitudes by means of the sensor elements.

In accordance with one development, the optical surface is configured in a made to measure manner depending on the region. In other words, the optical element and/or the optical surface are/is tailored (referred to as: tailored lens). To put it clearly, firstly what is determined is how the region is configured during intended use of the TOF camera and where the region is arranged relative to the TOF camera, in other words where the object is expected proceeding from the TOF camera, and then the optical surface is configured with dimensional accuracy, in particular with register accuracy with respect to the region. In particular, the optical surface is configured such that the region is illuminated or irradiated particularly well during intended use of the TOF camera.

In accordance with one development, the TOF camera comprises a housing, in which the radiation source, the sensor elements, the computing unit and the optical element are arranged.

One problem addressed by the invention is solved by means of a motor vehicle comprising the TOF camera, wherein the object is a traffic object. The traffic object can be for example another road user, for example another motor vehicle, a cyclist or a pedestrian, or any article situated in the vicinity of the motor vehicle, for example a traffic sign, a guardrail or traffic lights. If the TOF camera is arranged for example at a front or at a rear side of the motor vehicle, then on account of the solid angles having different magnitudes an object situated laterally in front of or laterally behind the motor vehicle can nevertheless be detected very well, in particular with a very good signal-to-noise ratio, and the distance to said object can be determined particularly precisely. If the TOF camera is arranged for example on a side of the motor vehicle, then on account of the solid angles having different magnitudes an object situated laterally in front of or laterally behind the motor vehicle can nevertheless be detected very well, in particular with a very good signal-to-noise ratio, and the distance to said object can be determined particularly precisely. If the motor vehicle moves relative to the object, then the solid angles having different magnitudes can be dynamically adapted in such a way that the solid angles that encompass the region in which the object is currently situated are particularly small, as a result of which a particularly precise determination of the distance to the object is possible at every point in time.

The developments and/or advantages explained above in association with the TOF camera can readily be applied to the motor vehicle.

One problem addressed by the invention is solved by means of a method for producing a TOF camera for determining a distance to an object, wherein a radiation source is arranged for emitting electromagnetic radiation in a direction toward the object, a plurality of radiation-sensitive sensor elements are arranged such that they detect the electromagnetic radiation reflected and/or scattered by the object, a computing unit is configured to determine a time duration required by the electromagnetic radiation from the radiation source to the object and from the object to the receiver and to determine the distance between the TOF camera and the object depending on the time duration determined, and is electrically connected to the radiation source and the sensor elements, and an optical element is arranged for the purpose of influencing the reflected and/or scattered electromagnetic radiation in the radiation path of the reflected and/or scattered electromagnetic radiation between the object and the sensor elements, wherein the sensor elements and/or the optical element are/is configured and arranged such that different sensor elements from among the latter detect the reflected and/or scattered electromagnetic radiation from correspondingly different solid angles on the far side of the optical element and that at least some of the far-side solid angles have different magnitudes.

The developments and/or advantages explained above in association with the TOF camera and the motor vehicle can readily be applied to the method for producing the TOF camera.

One problem addressed by the invention is solved by means of a method for determining a distance to an object, wherein electromagnetic radiation is emitted in a direction toward the object by means of a radiation source, the electromagnetic radiation is detected from different solid angles by means of a plurality of sensor elements, wherein at least part of the detected electromagnetic radiation is reflected and/or scattered by the object and wherein at least some of the solid angles have different magnitudes, a time duration is determined which is required by the electromagnetic radiation from the radiation source to the object and from the object to the receiver, and the distance to the object is determined depending on the time duration determined. The developments and/or advantages explained above in association with the TOF camera and the motor vehicle can readily be applied to the method for determining the distance to the object.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows one exemplary embodiment of a motor vehicle.

DESCRIPTION

In the following detailed description, reference is made to the accompanying drawings, which form part of this description and show for illustration purposes specific exemplary embodiments in which the invention can be implemented. Since components of exemplary embodiments can be positioned in a number of different orientations, the direction terminology serves for illustration and is not restrictive in any way whatsoever. It goes without saying that other exemplary embodiments can be used and structural or logical changes can be made, without departing from the scope of protection of the present invention. It goes without saying that the features of the various exemplary embodiments described herein can be combined with one another, unless specifically indicated otherwise. The following detailed description should therefore not be interpreted in a restrictive sense, and the scope of protection of the present invention is defined by the appended claims. In the figures, identical or similar elements are provided with identical reference signs, insofar as this is expedient.

Figure 1:
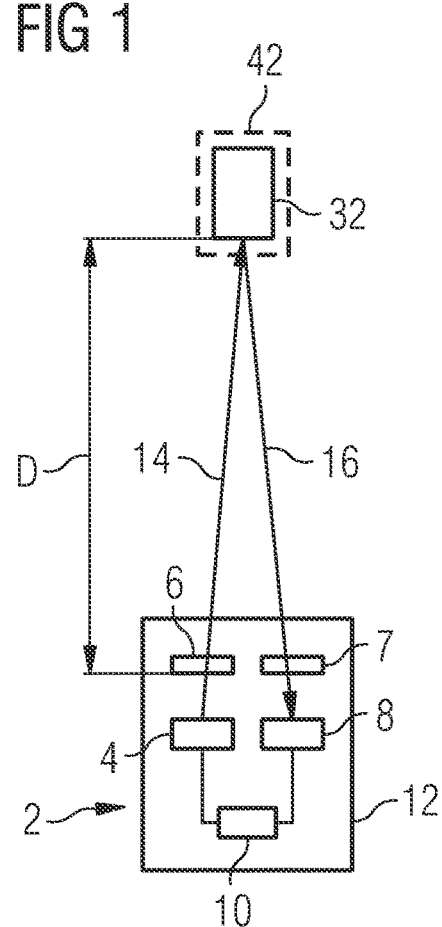
FIG. 1 shows a schematic illustration of a conventional TOF camera and of an object.

FIG. 1 shows a schematic illustration of a conventional TOF camera 2 and of an object 32. The conventional TOF camera 2 serves for determining a distance D between the conventional TOF camera 2 and the object 32. The object 32 is arranged in a first region 42.

The conventional TOF camera 2 comprises a conventional radiation source 4 for emitting electromagnetic radiation 14, a conventional emitter-side lens 6 for focusing or collimating the emitted electromagnetic radiation 14, a conventional optical element 7, a radiation-sensitive conventional sensor arrangement 8 and a conventional computing unit 10, which are arranged in a conventional housing 12.

During operation of the conventional TOF camera 2, the conventional radiation source 4 emits the electromagnetic radiation 14, which is influenced, for example focused or collimated, by means of the conventional emitter-side lens 6. The conventional TOF camera 2 is aligned such that the emitted electromagnetic radiation 14 impinges on the object 32. The object 32 reflects and/or scatters at least part of the electromagnetic radiation 14, such that reflected and/or scattered electromagnetic radiation 16 passes through the conventional optical element 7, impinges on the conventional sensor arrangement 8 and is detected by the latter.

The conventional computing unit 10 determines a time duration required by the electromagnetic radiation 14, 16 to pass from the conventional radiation source 4 as far as the conventional sensor arrangement 8. The conventional computing unit 10 determines the distance D depending on the time duration determined and the speed of light.

Figure 2:
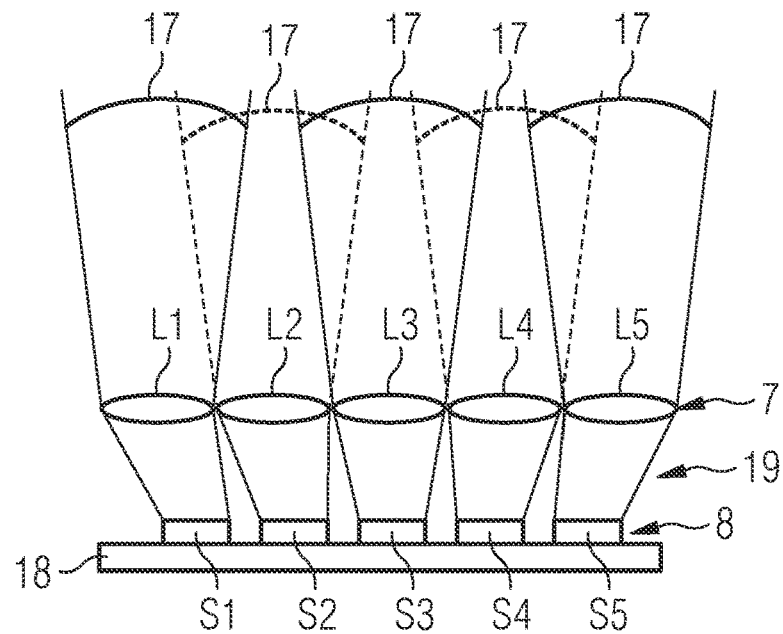
FIG. 2 shows a conventional optical element and a conventional sensor arrangement.

FIG. 2 shows the conventional optical element 7 and the conventional sensor arrangement 8. The principle underlying the conventional optical element 7 and the conventional sensor arrangement 8 is the same as in a multi-aperture camera and which in English is also referred to as "optical stitching of segments". The conventional optical element 7 comprises a plurality of conventional lenses L1, L2, L3, L4, L5. The sensor arrangement 8 comprises a plurality of conventional sensor elements S1, S2, S3, S4, S5, which are arranged on a conventional carrier 18. The conventional lenses L1, L2, L3, L4, L5 are respectively assigned to one of the sensor elements S1, S2, S3, S4, S5. The conventional lenses L1, L2, L3, L4, L5 focus the reflected and/or scattered electromagnetic radiation 16 coming from the object 32 onto the corresponding sensor elements S1, S2, S3, S4, S5, wherein the electromagnetic radiation 16 originates in each case from a specific conventional solid angle 17. These conventional solid angles 17 are situated on the far side of the conventional optical element 7 as viewed from the conventional sensor arrangement 8 and are therefore referred to as conventional far-side solid angles 17. Consequently, exactly one of the conventional far-side solid angles 17 can be assigned to each pair comprising one of the conventional lenses L1, L2, L3, L4, L5 and the sensor element S1, S2, S3, S4, S5 assigned to said conventional lens L1, L2, L3, L4, L5.

The electromagnetic radiation 16 that has passed through the conventional lenses L1, L2, L3, L4, L5 is focused onto the corresponding sensor elements S1, S2, S3, S4, S5. Each of the conventional lenses L1, L2, L3, L4, L5 is arranged at a corresponding conventional solid angle 19 on the near side of the optical element 7 as viewed from the corresponding sensor element S1, S2, S3, S4, S5. Therefore, these conventional solid angles 19 are also referred to as conventional near-side solid angles 19.

The conventional far-side solid angles 17 have identical magnitudes. Moreover, the conventional near-side solid angles 19 have identical magnitudes.

A signal-to-noise ratio of a signal representative of the distance D is all the better, the smaller the conventional solid angles 17, 19. To put it clearly, the signal-to-noise ratio of the signal is all the better, the smaller the region observed by means of one of the sensor elements S1, S2, S3, S4, S5.

Figure 3:
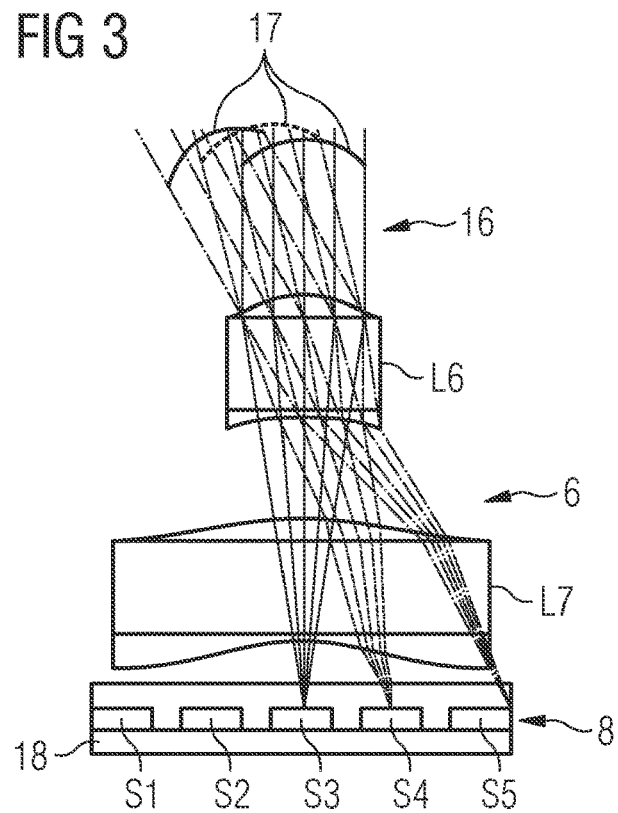
FIG. 3 shows a conventional optical element and a conventional sensor arrangement.

FIG. 3 shows an alternative conventional optical element 7 and the conventional sensor arrangement 8. The principle underlying the conventional optical element 7 and the conventional sensor arrangement 8 is the same as in a single-aperture camera. The conventional optical element 7 comprises two conventional lenses L5, L6, which are arranged one behind the other in the beam path of the reflected and/or scattered electromagnetic radiation 16. The sensor arrangement 8 comprises the plurality of conventional sensor elements S1, S2, S3, S4, S5. Both conventional lenses L6, L7 are assigned to all the sensor elements S1, S2, S3, S4, S5. The conventional lenses L6, L7 direct the reflected and/or scattered electromagnetic radiation 16 coming from the object 32 onto the sensor elements S1, S2, S3, S4, S5. Each of the sensor elements S1, S2, S3, S4, S5 detects the reflected and/or scattered electromagnetic radiation 16 from a respective specific conventional solid angle 17. These conventional solid angles 17 are situated on the far side of the conventional optical element 7 as viewed from the conventional sensor arrangement 8 and are therefore referred to as conventional far-side solid angles 17. Consequently, exactly one of the conventional far-side solid angles 17 can be assigned to each sensor element S1, S2, S3, S4, S5. The conventional far-side solid angles 17 have identical magnitudes.

A signal-to-noise ratio of a signal representative of the distance D is all the better, the smaller the conventional solid angles 17. To put it clearly, the signal-to-noise ratio of the signal is all the better, the smaller the region observed by means of one of the sensor elements S1, S2, S3, S4, S5.

Figure 4:
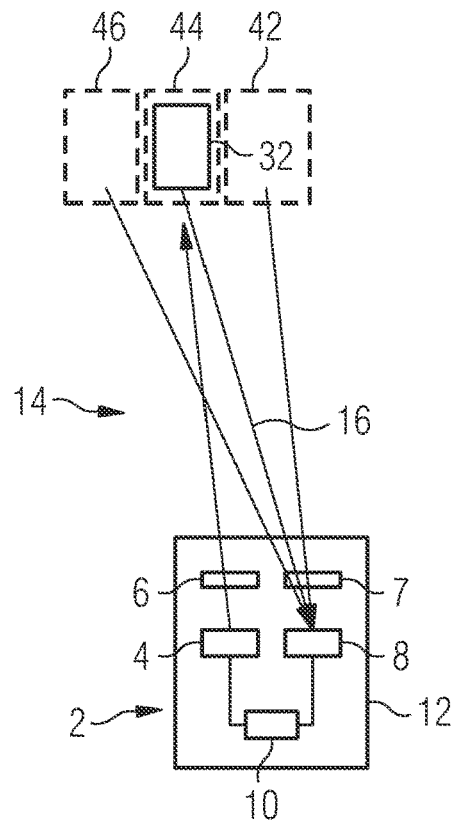
FIG. 4 shows a schematic illustration of the conventional TOF camera and of the object in accordance with FIG. 1.

FIG. 4 shows a schematic illustration of the conventional TOF camera 2 in accordance with FIG. 1 and of the conventional object 32, wherein the object 32 is arranged in a second region 44, which is situated alongside the first region 42. Moreover, FIG. 4 depicts a third region 46, which is arranged on a side of the second region 44 facing away from the first region 42.

In FIG. 4, in order to simplify the illustration, the first, second and third regions 42, 44, 46 are depicted as different regions arranged alongside one another. In reality, the first, second and third regions 42, 44, 46 can actually be regarded as different regions. As an alternative thereto, however, the first, second and third regions 42, 44, 46 may merely represent different positions of one moving region. By way of example, the predefined region can correspond to the first region 42 at a first point in time, can correspond to the second region 44 at a second point in time and can correspond to the third region 46 at a third point in time. In other words, the first, second and third regions 42, 44, 46 can be representative of a movement of the predefined region.

Independently of where the object 32 is situated, in particular whether it is situated in the first region 42, in the second region 44 or in the third region 46, the distance D to the object 32 is always detected with the same precision on account of the conventional far-side solid angles 17 having identical magnitudes and the uniform signal-to-noise ratio resulting therefrom. If it is then known, however, that the object 32 preferably stays in one of the regions 42, 44, 46 or that the object 32 moves with high probability from one of the regions 42, 44, 46 to another of the regions 42, 44, 46, the conventional TOF camera 2 affords no possibility of being able to ascertain the distance D with increased precision on the basis of these known boundary conditions.

Figure 5:
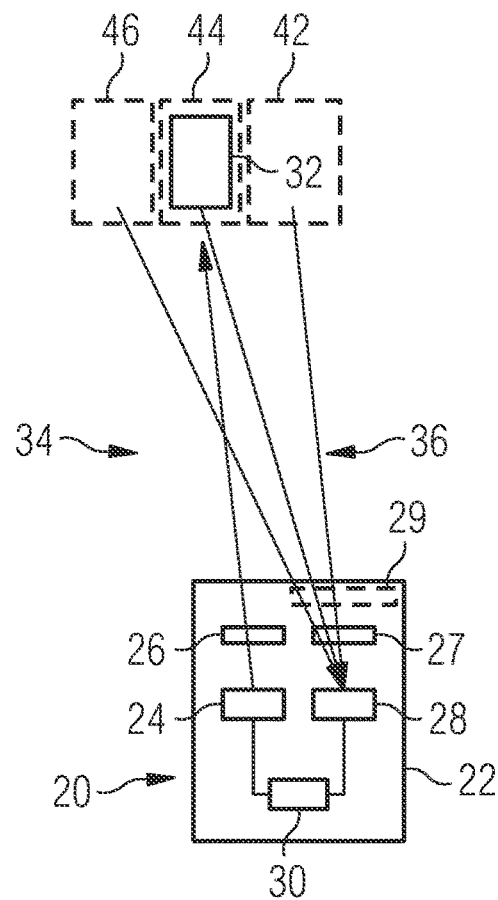
FIG. 5 shows a schematic illustration of one exemplary embodiment of a TOF camera and of an object.

FIG. 5 shows a schematic illustration of one exemplary embodiment of a TOF camera 20 and of an object 32. The TOF camera 20 serves for determining the distance D between the TOF camera 20 and the object 32. The object 32 is arranged in the second region 44 in the situation illustrated.

The TOF camera 20 comprises a radiation source 24, a lens element 26, an optical element 27, a radiation-sensitive sensor arrangement 28 and a computing unit 30, which are arranged in a housing 22. The radiation source 24 can comprise one, two or more light emitting components, for example LEDs, OLEDs and/or laser diodes. Optionally, the radiation source 24 can comprise one, two or more radiation-influencing elements, such as, for example, lenses and/or filters and/or radiation-refracting, radiation-scattering or radiation-diffracting elements. The lens element 27 can comprise for example one, two or more lenses and/or optical surfaces. The optical element 27 can comprise for example one, two or more lenses and/or optical surfaces. The sensor arrangement 28 can comprise two or more sensor elements T1, T2, T3, T4, T5 (see FIG. 6), for example photosensors. The computing unit 30 can comprise one, two or more microchips, electronic circuits, processors and/or storage units.

During operation of the TOF camera 20, the radiation source 24 emits electromagnetic radiation 34, which is influenced, for example focused and/or collimated, by means of the lens element 27. The TOF camera 20 can be driven by means of the computing unit 30, for example. The TOF camera 20 can modulate for example the electromagnetic radiation 34, for example in the form of a sinusoidal signal or a rectangular signal. The TOF camera 20 is aligned such that the emitted electromagnetic radiation 24 impinges on the object 32. The object 32 reflects and/or scatters at least part of the electromagnetic radiation 24, such that reflected and/or scattered electromagnetic radiation 36 passes through the optical element 27, impinges on the sensor arrangement 28 and is detected by the latter.

The computing unit 30 determines a time duration required by the electromagnetic radiation 34, 36 to pass from the radiation source 24 as far as the sensor elements T1, T2, T3, T4, T5. To that end, the computing unit 30 can determine for example a phase shift between the emitted electromagnetic radiation 34 and the received electromagnetic radiation 36. The computing unit 30 determines the distance D depending on the time duration determined and the speed of light.

Figure 6:
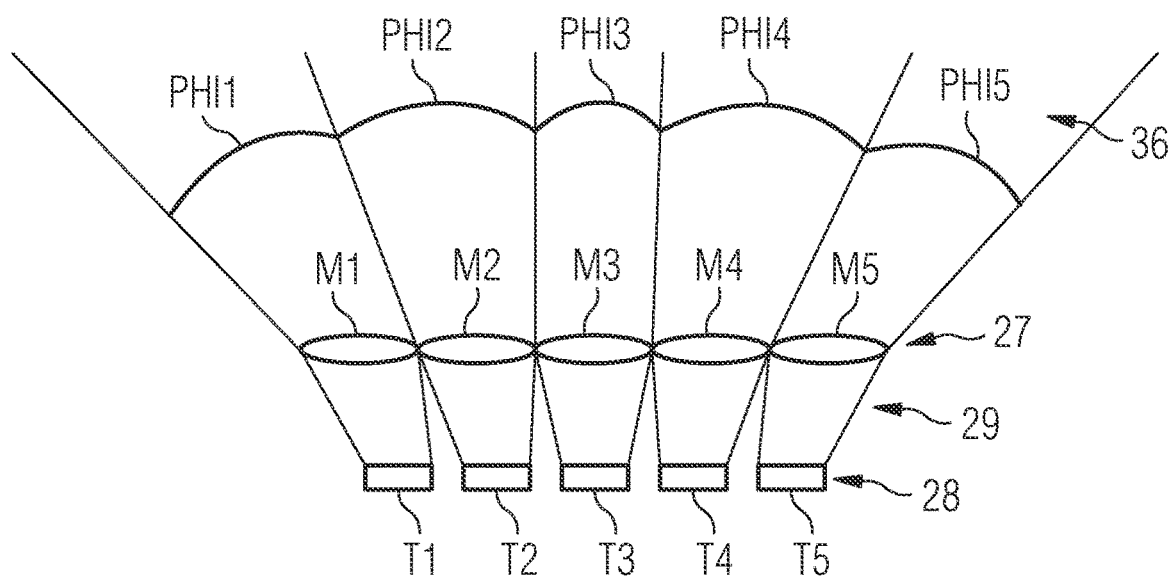
FIG. 6 shows one exemplary embodiment of an optical element and of a sensor arrangement.

FIG. 6 shows one exemplary embodiment of the optical element 7 and of the sensor arrangement 28. The principle underlying the optical element 27 and the sensor arrangement 28 is similar to that of the multi-aperture camera explained with reference to FIG. 2. The optical element 27 comprises a plurality of lenses M1, M2, M3, M4, M5. The sensor arrangement 28 comprises a plurality of sensor elements T1, T2, T3, T4, T5, which are arranged on a carrier 28. The lenses M1, M2, M3, M4, M5 are respectively assigned to one of the sensor elements T1, T2, T3, T4, T5. In particular, a first lens M1 is assigned to a first sensor element T1, a second lens M2 is assigned to a second sensor element T2, a third lens M3 is assigned to a third sensor element T3, a fourth lens M4 is assigned to a fourth sensor element T4, and a fifth lens M5 is assigned to a fifth sensor element T5. The lenses M1, M2, M3, M4, M5 focus the reflected and/or scattered electromagnetic radiation 36 coming from the object 32 onto the corresponding sensor elements T1, T2, T3, T4, T5, wherein the electromagnetic radiation 36 respectively originates from a specific solid angle PHI1, PHI2, PHI3, PHI4, PHI5. These solid angles PHI1, PHI2, PHI3, PHI4, PHI5 are situated on the far side of the optical element 27 as viewed from the sensor arrangement 28 and are therefore referred to as far-side solid angles PHI1, PHI2, PHI3, PHI4, PHI5. Consequently, exactly one of the far-side solid angles PHI1, PHI2, PHI3, PHI4, PHI5 is assigned to each pair comprising one of the lenses M1, M2, M3, M4, M5 and the sensor element T1, T2, T3, T4, T5 assigned to said lens M1, M2, M3, M4, M5.

In particular, a first far-side solid angle PHI1 can be assigned to the first sensor element T1 and the first lens M1. A second far-side solid angle PHI2 can be assigned to the second sensor element T2 and the second lens M2. A third far-side solid angle PHI3 can be assigned to the third sensor element T3 and the third lens M3. A fourth far-side solid angle PHI4 can be assigned to the fourth sensor element T4 and the fourth lens M4. A fifth far-side solid angle PHI5 can be assigned to the fifth sensor element T5 and the fifth lens M5.

Consequently, the electromagnetic radiation 36 coming from the first solid angle PHI1 passes through the first lens M1 and is detected by the first sensor element T1. The electromagnetic radiation 36 coming from the second solid angle PHI2 passes through the second lens M2 and is detected by the second sensor element T2. The electromagnetic radiation 36 coming from the third solid angle PHI3 passes through the third lens M3 and is detected by the third sensor element T3. The electromagnetic radiation 36 coming from the fourth solid angle PHI4 passes through the fourth lens M4 and is detected by the fourth sensor element T4. The electromagnetic radiation 36 coming from the fifth solid angle PHI5 passes through the fifth lens M5 and is detected by the fifth sensor element T5.

The electromagnetic radiation 36 that has passed through the lenses M1, M2, M3, M4, M5 is focused onto the corresponding sensor elements T1, T2, T3, T4, T5. Each of the lenses M1, M2, M3, M4, M5 is arranged at a corresponding solid angle 29 on the near side of the optical element 27 as viewed from the sensor element T1, T2, T3, T4, T5. Therefore, these solid angles 29 are also referred to as near-side solid angles 29.

The far-side solid angles PHI1, PHI2, PHI3, PHI4, PHI5 have different magnitudes. In particular, the third far-side solid angle PHI3 is greater than the second and fourth far-side solid angles PHI2, PHI4, and the second and third far-side solid angles PHI2, PHI3 are greater than the first and fifth far-side solid angles PHI1, PHI5. A signal-to-noise ratio of a signal representative of the distance D is all the better, the smaller the solid angles PHI1, PHI2, PHI3, PHI4, PHI5. To put it clearly, the signal-to-noise ratio of the signal is all the better, the smaller the region observed by means of one of the sensor elements T1, T2, T3, T4, T5. Consequently, the distance D to the object 32 in the case of the exemplary embodiment shown in FIG. 6 can be determined the most precisely if the object 32 lies within the third far-side solid angle PHI3. For the exemplary embodiment shown in FIG. 6, this would be the case if the object 32 were arranged centrally in front of the optical element 27 and/or the sensor arrangement 28, in particular in the first region 42.

If it is known, however, that, in the case of a specific application for which the TOF camera 20 is to be used, the object 32 is regularly arranged in a different region 42, 44, 46 or expected there, then an optical element 27 adapted to said application can be used therefor. In the case of said optical element 27 it is then possible to ensure that the far-side solid angle PHI1, PHI2, PHI3, PHI4, PHI5 at which the object 32 is normally arranged or normally expected in the case of this application is particularly small. In this way, the optical element 27 can be optimized even for applications in which the object 32 normally is not arranged or expected centrally in front of the TOF camera 20.

Figure 7:
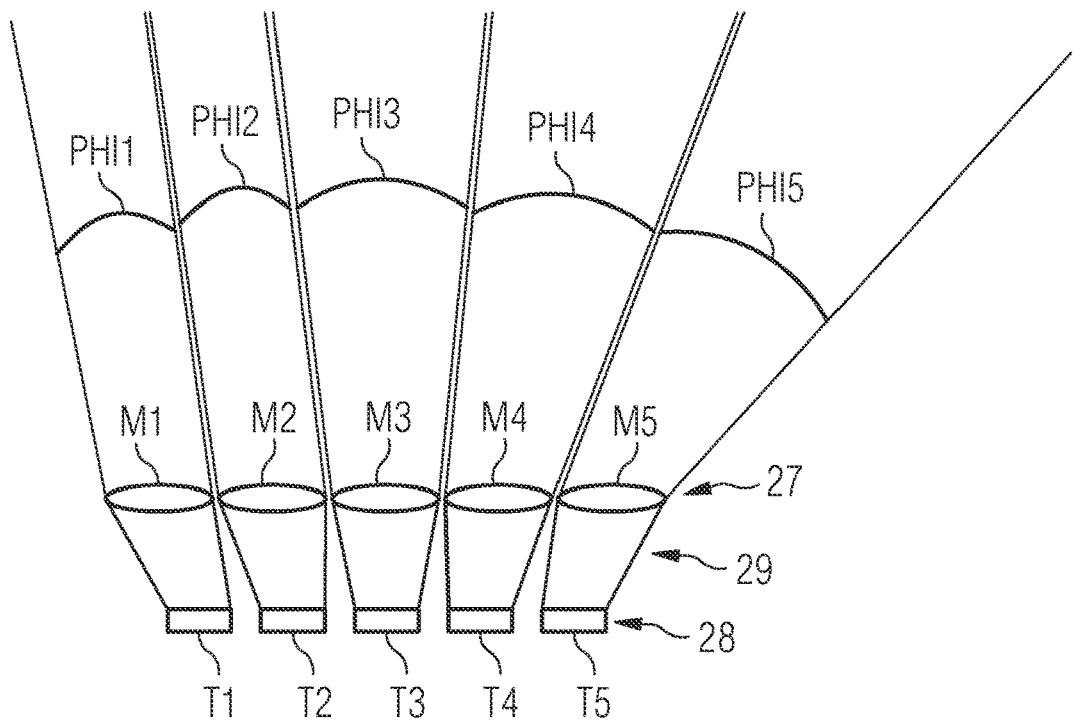
FIG. 7 shows a schematic side view of one exemplary embodiment of an optical element and of a sensor arrangement.

FIG. 7 shows a schematic side view of an exemplary embodiment of an optical element 27 and of a sensor arrangement 28, which may largely correspond to the optical element 27 and sensor arrangement 28 respectively explained with reference to FIG. 6. In contrast to the exemplary embodiment shown in FIG. 6, however, the exemplary embodiment shown in FIG. 7 is optimized toward the object 32 not being situated centrally in front of the TOF camera 20, but rather to the left thereof relative to the figures, for example in the second region 44 or in the third region 46. Since it is assumed that the object 32 is situated in the second region 44 or at least that the object 32 is expected in the second region 44, the far-side solid angles PHI1, PHI2, PHI3, PHI4, PHI5 are set such that the second region 44 lies at particularly small far-side solid angles PHI1, PHI2, PHI3, PHI4, PHI5 from among the latter. In particular, the first and second far-side solid angles PHI1, PHI2 are relatively small and the third far-side solid angle PHI3 is relatively large in comparison with the exemplary embodiment explained with reference to FIG. 6. As a result, a very good signal-to-noise ratio can be achieved by means of the TOF camera 20 even though the object 32 is not situated centrally in front of the TOF camera 20, for which reason the distance D to the object 32 can be determined very precisely.

Optionally, the lenses M1, M2, M3, M4, M5 of the optical element 27 illustrated in FIGS. 6 and 7 can each be driven such that the magnitudes of the corresponding far-side solid angles PHI1, PHI2, PHI3, PHI4, PHI5 are variable. Upon a variation of the optical surfaces of the lenses M1, M2, M3, M4, M5, the far-side solid angles PHI1, PHI2, PHI3, PHI4, PHI5 assigned to the corresponding lenses M1, M2, M3, M4, M5 change as well. By way of example, in a first drive state of the optical element 27, one of the far-side solid angles PHI1, PHI2, PHI3, PHI4, PHI5 can then have a predefined magnitude and, in a second drive state, the same solid angle PHI1, PHI2, PHI3, PHI4, PHI5 can have a different magnitude than in the first drive state. To that end, by way of example, the lenses M1, M2, M3, M4, M5 can each have at least one optical surface that is dynamically variable. By way of example, the lenses M1, M2, M3, M4, M5, and in particular the optical surfaces, are variable by means of electric current and/or by means of electrical voltage. By way of example, the lenses M1, M2, M3, M4, M5 are electrically drivable fluid lenses.

In this case, FIGS. 6 and 7 may show the same exemplary embodiments of the optical element 27 and of the sensor arrangement 28, wherein FIG. 6 illustrates a drive state which is optimized for example toward the object 32 being situated frontally in front of the TOF camera 20, in particular frontally in front of the optical element 27 and the sensor arrangement 28, for example in the first region 42. In contrast thereto, FIG. 7 illustrates a drive state which is optimized toward the object 32 in FIG. 5 having moved toward the left and then being situated laterally in front of the TOF camera 20, in particular laterally in front of the optical element 27 and the sensor arrangement 28, for example in the second region 44 or in the third region 46.

Consequently, if the object 32 moves, the magnitudes of the far-side solid angles PHI1, PHI2, PHI3, PHI4, PHI5 can be adapted in such a way that the region 42, 44, 46 in which the object 32 is then situated on account of its movement is covered with the smallest possible far-side solid angles PHI1, PHI2, PHI3, PHI4, PHI5. In this case, even in the event of a movement of the object 32, a very good signal-to-noise ratio can be achieved by means of the TOF camera 20, for which reason the distance D to the object 32 can be determined very precisely at any time.

The near-side solid angles 29 have identical magnitudes in the case of the exemplary embodiments shown in FIGS. 6 and 7. However, the near-side solid angles 29 can also be adapted to the region 42, 44, 46 in which the object 32 is arranged or expected in the case of the corresponding application, or to the movement of the object 32, in a manner corresponding to the far-side solid angles PHI1, PHI2, PHI3, PHI4, PHI5. In particular, the near-side solid angles 29 assigned to the sensor elements T1, T2, T3, T4, T5 which are expected to detect the object 32 can be particularly small. This can be achieved in particular by corresponding design of the sensor elements T1, T2, T3, T4, T5. Consequently, the corresponding TOF camera 20 can be adapted to the desired application by targeted adaptation of the near-side and/or far-side solid angles 29, PHI1, PHI2, PHI3, PHI4, PHI5.

Figure 8:
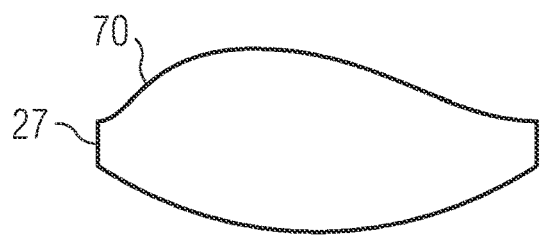
FIG. 8 shows one exemplary embodiment of an optical element.

FIG. 8 shows one exemplary embodiment of an optical element 27, for example of the optical element 27 explained above. The optical element 27 comprises a lens comprising an asymmetrical optical surface 70. The optical element 27 having the asymmetrical optical surface 70 can be used as an alternative to the optical elements 27 shown in FIGS. 6 and 7 in the case of the TOF camera 20 that was explained with reference to FIG. 5. The asymmetrical optical surface 70 has the effect that the reflected and/or scattered electromagnetic radiation 36 that passes through the optical element 27 subsequently has an asymmetrical radiation distribution, and that the far-side solid angles PHI1, PHI2, PHI3, PHI4, PHI5 assigned to the sensor elements T1, T2, T3, T4, T5 have different magnitudes.

Figure 9:
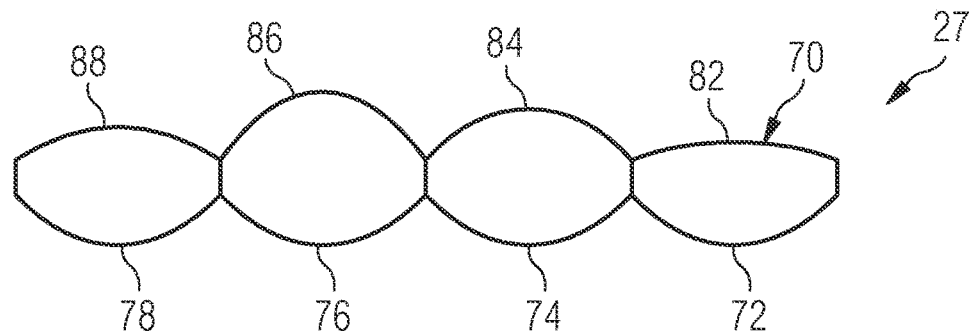
FIG. 9 shows one exemplary embodiment of an optical element.

FIG. 9 shows one exemplary embodiment of an optical element 27, for example of the optical element 27 explained above. The optical element 27 can be used as an alternative to the optical elements 27 shown in FIGS. 6, 7 and 8 in the case of the TOF camera 20 that was explained with reference to FIG. 5. The optical element 27 comprises a first segment 72, a second segment 74, a third segment 76 and a fourth segment 78. The optical element 27 comprises the asymmetrical optical surface 70. The optical surface 70 comprises a first partial surface 82 formed at the first segment 72, a second partial surface 84 formed at the second segment 74, a third partial surface 86 formed at the third segment 76, and a fourth partial surface 88 formed at the fourth segment 78. The partial surfaces 82, 84, 86, 88 can each be configured in a symmetrical or asymmetrical fashion. If the partial surfaces 82, 84, 86, 88 are symmetrical in each case, then they are configured differently from one another and arranged in such a way that overall the optical surface 70 is asymmetrical. The asymmetrical optical surface 70 has the effect that the reflected and/or scattered electromagnetic radiation 36 that passes through the optical element 27 subsequently has an asymmetrical radiation distribution, and that the far-side solid angles PHI1, PHI2, PHI3, PHI4, PHI5 assigned to the sensor elements T1, T2, T3, T4, T5 have different magnitudes.

In the case of the optical elements 27 explained with reference to FIGS. 8 and 9, the asymmetrical optical surfaces 70 are formed in each case at an exit surface of the corresponding optical element 27. As an alternative thereto, the asymmetrical optical surfaces 70 can also be formed at the entrance surfaces of the corresponding optical elements 27 or at inner surfaces of the corresponding optical elements 27, said inner surfaces being spaced apart from the entrance surfaces and exit surfaces.

FIG. 10 shows one exemplary embodiment of a motor vehicle 90 comprising a TOF camera 20, for example one of the TOF cameras 20 explained above with reference to FIGS. 5 to 9. The TOF camera 20 is arranged for example at a front of the motor vehicle 90. As an alternative thereto, the TOF camera 20 can also be arranged at the rear or at one of the sides of the motor vehicle 90. Furthermore, in addition to the one TOF camera 20, one, two or more further TOF cameras 20 can be arranged in the motor vehicle 90. In the motor vehicle 90 the TOF camera 20 serves for determining the distance D to the object 32, which in this context is a traffic object, for example a pedestrian, a cyclist, another motor vehicle or a guardrail.

On account of the design of the motor vehicle 90 and on account of the structure of the TOF camera 20, the latter is arranged such that a front side of the TOF camera 20 and in particular a front side of the radiation source 24 of the TOF camera 20 are aligned perpendicularly to the direction of travel. However, the TOF camera 20 is intended to be used to determine distances D to objects 32 which are not arranged directly frontally in front of the motor vehicle 90, but rather are arranged laterally in front of the motor vehicle 90 in a manner offset with respect to the direction of travel. Therefore, the TOF camera 20 is configured such that it generates the far-side solid angles PHI1, PHI2, PHI3, PHI4, PHI5 having different magnitudes, specifically such that the region 42, 44, 46 in which the object 32 will most likely appear and/or which is intended to be monitored with the highest accuracy is covered by means of the smallest far-side solid angles PHI1, PHI2, PHI3, PHI4, PHI5. If the TOF camera 20, as explained above, is configured such that the magnitudes of the far-side solid angles PHI1, PHI2, PHI3, PHI4, PHI5 are variable, then the region 42, 44, 46 in which the distance D can be determined with the greatest precision can be correspondingly varied or moved.

The invention is not restricted to the embodiments indicated. By way of example, the embodiments can be combined with one another. By way of example, the optical element 27 can be part of the sensor arrangement 28. Furthermore, more or fewer regions 42, 44, 46 can be provided. Furthermore, more or fewer sensor elements T1, T2, T3, T4, T5, more or fewer lenses M1, M2, M3, M4, M5, optical elements 27 and/or more or fewer segments 72, 74, 76, 78 can be provided.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A TOF camera for determining a distance to an object, comprising
   a radiation source, which is configured to emit electromagnetic radiation in a direction toward the object,
   a plurality of radiation-sensitive sensor elements, which are configured and arranged such that they detect the electromagnetic radiation reflected and/or scattered by the object,
   an optical element, which is arranged for the purpose of influencing the reflected and/or scattered electromagnetic radiation in the radiation path of the reflected and/or scattered electromagnetic radiation between the object and the sensor elements, and
   a computing unit, which is electrically connected to the radiation source and the sensor elements and which is configured to determine a time duration required by the electromagnetic radiation from the radiation source to the object and from the object to the sensor elements and to determine the distance between the TOF camera and the object depending on the time duration determined,
   wherein the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes; and
   wherein the optical element and/or the sensor elements are configured such that the magnitudes of the far-side solid angles are adapted to a region in which the object is expected proceeding from the TOF camera.

2. The TOF camera as claimed in claim 1, wherein the optical element and/or the sensor elements are/is configured such that one or a plurality of the far-side solid angles within which the region lies is or are smaller than the far-side solid angles within which the region does not lie.

3. The TOF camera as claimed in claim 1, wherein the optical element and/or the sensor elements are configured such that, in the case of a dynamic variation of the region, the magnitudes of the far-side solid angles are adapted depending on the dynamic variation of the region.

4. The TOF camera as claimed in claim 1, wherein the sensor elements are disposed on a near side of the optical element (27), the near side being an opposite side of the optical element (27) than the far side, and are configured such that different sensor elements from among the plurality of sensors detect the electromagnetic radiation that has passed through the optical element from correspondingly different near-side solid angles on a near side of the optical element and that at least some of the near-side solid angles have different magnitudes.

5. The TOF camera as claimed in claim 3, wherein the sensor elements are disposed on a near side of the optical element (27), the near side being an opposite side of the optical element (27) than the far side, and are configured such that the magnitudes of the near-side solid angles are adapted depending on the dynamic variation of the region.

6. The TOF camera as claimed in claim 5, wherein the sensor elements form a camera.

7. The TOF camera as claimed in claim 1, wherein the optical element comprises at least one asymmetrical optical surface arranged such that the reflected and/or scattered electromagnetic radiation passes through the asymmetrical optical surface.

8. The TOF camera as claimed in claim 7, wherein the optical element is configured such that the asymmetrical optical surface is adapted depending on the dynamic variation of the region.

9. The TOF camera as claimed in claim 7, wherein the asymmetrical optical surface is configured as radiation-diffracting, radiation-refracting and/or segmented.

10. The TOF camera as claimed in claim 7, wherein the optical surface is configured in a made to measure manner depending on the region.

11. The TOF camera as claimed in claim 1, comprising a housing, in which the radiation source, the sensor elements, the computing unit and the optical element are arranged.

12. The TOF camera as claimed in claim 1, wherein the TOF camera is arranged in a motor vehicle.

13. The TOF camera as claimed claim 1, wherein the object is a traffic object.

14. A method for producing a TOF camera for determining a distance to an object, wherein
a radiation source is arranged for emitting electromagnetic radiation in a direction toward the object,
a plurality of radiation-sensitive sensor elements are arranged such that they detect electromagnetic radiation reflected and/or scattered by the object,
a computing unit is configured to determine a time duration required by the electromagnetic radiation from the radiation source to the object and from the object to the sensor elements and to determine the distance between the TOF camera and the object depending on the time duration determined, and is electrically connected to the radiation source and the sensor elements, and
an optical element is arranged for the purpose of influencing the reflected and/or scattered electromagnetic radiation in the radiation path of the reflected and/or scattered electromagnetic radiation between the object and the sensor elements,
wherein the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes; and
wherein the optical element and/or the sensor elements are configured such that the magnitudes of the far-side solid angles are adapted to a region in which the object is expected proceeding from the TOF camera.

15. A method for determining a distance to an object, wherein
electromagnetic radiation is emitted in a direction toward the object by means of a radiation source,
reflected and/or scattered electromagnetic radiation is detected from different solid angles by means of a plurality of sensor elements, wherein at least part of the detected reflected and/or scattered electromagnetic radiation is reflected and/or scattered by the object and wherein at least some of the solid angles have different magnitudes,
a time duration is determined which is required by the electromagnetic radiation from the radiation source to the object and from the object to the sensor elements,
the distance to the object is determined depending on the time duration determined; and
the sensor elements are configured such that the magnitudes of the solid angles are adapted to a region in which the object is expected proceeding from the radiation source.

16. The method of claim 15, wherein
an optical element is arranged for the purpose of influencing the reflected and/or scattered electromagnetic radiation in the radiation path of the reflected and/or scattered electromagnetic radiation between the object and the sensor elements, and
the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes.

17. A TOF camera for determining a distance to an object, comprising
a radiation source, which is configured to emit electromagnetic radiation in a direction toward the object,
a plurality of radiation-sensitive sensor elements, which are configured and arranged such that they detect the electromagnetic radiation reflected and/or scattered by the object,
an optical element, which is arranged for the purpose of influencing the reflected and/or scattered electromagnetic radiation in the radiation path of the reflected and/or scattered electromagnetic radiation between the object and the sensor elements, and
a computing unit, which is electrically connected to the radiation source and the sensor elements and which is configured to determine a time duration required by the electromagnetic radiation from the radiation source to the object and from the object to the sensor elements and to determine the distance between the TOF camera and the object depending on the time duration determined,
wherein the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes; and
wherein the optical element comprises at least one asymmetrical optical surface arranged such that the reflected and/or scattered electromagnetic radiation passes through the asymmetrical optical surface.

18. A method for producing a TOF camera for determining a distance to an object, wherein
a radiation source is arranged for emitting electromagnetic radiation in a direction toward the object,
a plurality of radiation-sensitive sensor elements are arranged such that they detect electromagnetic radiation reflected and/or scattered by the object,
a computing unit is configured to determine a time duration required by the electromagnetic radiation from the radiation source to the object and from the object to the sensor elements and to determine the distance between the TOF camera and the object depending on the time duration determined, and is electrically connected to the radiation source and the sensor elements, and
an optical element is arranged for the purpose of influencing the reflected and/or scattered electromagnetic radiation in the radiation path of the reflected and/or scattered electromagnetic radiation between the object and the sensor elements,
wherein the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes; and
wherein the optical element comprises at least one asymmetrical optical surface arranged such that the reflected and/or scattered electromagnetic radiation passes through the asymmetrical optical surface.

19. A method for determining a distance to an object, wherein
electromagnetic radiation is emitted in a direction toward the object by means of a radiation source, reflected and/or scattered electromagnetic radiation is detected from different solid angles by means of a plurality of sensor elements, wherein at least part of the detected reflected and/or scattered electromagnetic radiation is reflected and/or scattered by the object and wherein at least some of the solid angles have different magnitudes, a time duration is determined which is required by the electromagnetic radiation from the radiation source to the object and from the object to the sensor elements, the distance to the object is determined depending on the time duration determined; and an optical element is arranged for the purpose of influencing the reflected and/or scattered electromagnetic radiation in the radiation path of the reflected and/or scattered electromagnetic radiation between the object and the sensor elements, and the optical element comprises at least one asymmetrical optical surface arranged such that the reflected and/or scattered electromagnetic radiation passes through the asymmetrical optical surface.

20. The method of claim 19, wherein an optical element is arranged for the purpose of influencing the reflected and/or scattered electromagnetic radiation in the radiation path of the reflected and/or scattered electromagnetic radiation between the object and the sensor elements, and the sensor elements and/or the optical element are/is configured such that different sensor elements from among the plurality of sensor elements detect the reflected and/or scattered electromagnetic radiation from correspondingly different solid angles on a far side of the optical element and that at least some of the far-side solid angles have different magnitudes.

* * * * *